UNITED STATES PATENT OFFICE.

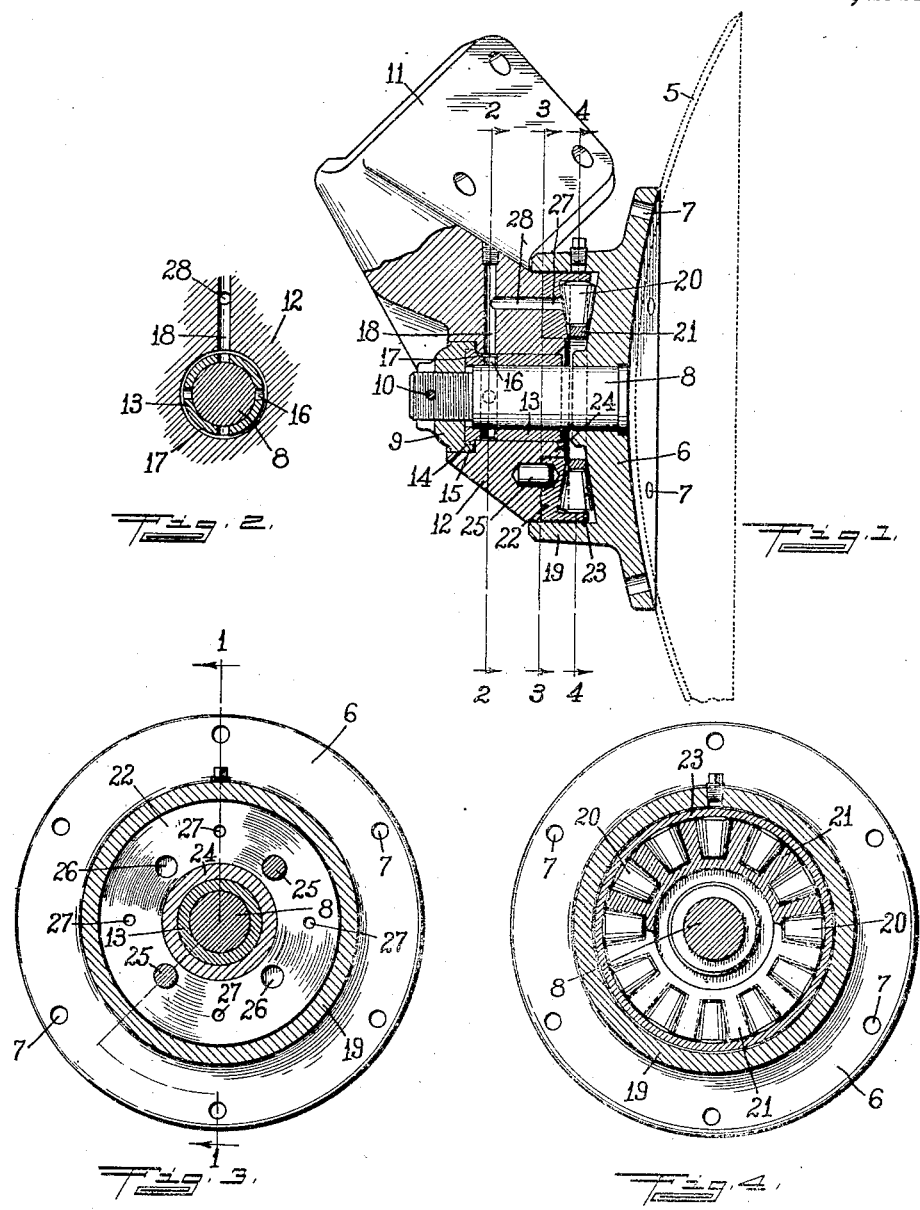

ALBERT JENSEN, OF OMAHA, NEBRASKA, ASSIGNOR TO STROUD & COMPANY, OF OMAHA, NEBRASKA, A CORPORATION OF NEBRASKA.

DISK-PLOW BEARING.

1,371,489.   Specification of Letters Patent.   Patented Mar. 15, 1921.

Application filed August 15, 1917. Serial No. 186,424.

*To all whom it may concern:*

Be it known that I, ALBERT JENSEN, a citizen of the United States, and a resident of Omaha, in the county of Douglas and State of Nebraska, have invented certain new and useful Improvements in Disk-Plow Bearings, of which the following is a specification.

My invention relates to disk-plow bearings, and it is the general object thereof to provide bearings adapted for use with large disk-plows such as are employed in road-grading machines, and capable of withstanding the severe usage to which bearings of this kind are subjected. Particular objects of my invention are to provide, in a bearing of the class mentioned, anti-friction rollers for receiving the thrust of the plow-disk, spacing and confining means for said rollers, means for altering the position of the stationary roller-race to distribute wear thereon, means for excluding foreign matter from the bearing, and means for efficiently lubricating the bearings.

In the accompanying drawings Figure 1 is an axial section of a bearing constructed in accordance with my invention, the plane of section being slightly irregular as indicated by the line 1—1 of Fig. 3, and Figs. 2, 3 and 4 are detail transverse sections on the respective planes of the lines 2—2, 3—3 and 4—4 of Fig. 1.

The structure shown in the drawings is adapted for use with a plow-disk 5 of the usual sphero-segmental or concavo-convex form, partially indicated by dotted lines in Fig. 1. A backing-plate 6, having a concave face adapted to receive the convex side of the plow-disk, has openings 7 near its edge to receive suitable rivets or bolts by which the plow-disk is secured to the plate. At the center of the backing-plate there is a short hub having a central bore in which the head-portion of a pin 8 is force-fitted, the head of the pin lying within a counterbore in the face of the plate adjoining the back side of the plow-disk. The rear end-portion of the pin 8 is shouldered to a slightly smaller diameter and threaded to receive a castle-nut 9 which is retained in fixed relation to the pin by means of a cross-pin or cotter 10 extending through the castled end of the nut. A suitable supporting bracket or hanger is provided, having a shank-portion 11 with openings therein for receiving bolts to secure the same to the main frame of the plow or machine on which the disk structure is carried. Formed integrally with the shank-portion 11 there is a head 12 of approximately trunco-conical form, said head having a longitudinal opening therein coaxial with the pin 8, and the rearward end of said opening being enlarged to form a counterbore in which the castle-nut 9 fits revolubly. A sleeve 13, of bearing-metal such as bronze, is force-fitted in said longitudinal opening of the head 12, said sleeve having an end-flange 14 lying within the counterbore at the end of the opening, and the nut 9 having a marginal rim or flange 15 fitting around said flange 14, as shown. The body of the pin 8 fits revolubly in the bore of said sleeve 13, which forms the axial bearing for the plow-disk, and said bearing is supplied with lubricant as follows: From the bore of the sleeve several openings 16 extend out radially to connect with an annular channel 17 in the outer side of the sleeve, as shown in Figs. 1 and 2. Said channel 17 is in communication with a passage 18 through the head 12, and the outer end of said passage 18 is threaded to receive a suitable oil- or grease-cup from which the lubricant is supplied to the bearing through the described passages.

On the rear side of the backing-plate 6 there is an annular flange 19, concentric with the pin 8, the end of said flange fitting revolubly about the adjacent large end of the head 12. The rear surface of the backing-plate, between said flange 19 and the projecting hub around the pin 8, forms one of the races or bearing-surfaces for a series of trunco-conical rollers 20, the axes of said rollers being radial to the axis of the pin 8. The rollers are kept in properly spaced relation to each other by means of a retainer-plate 21, provided in its outer edge-portion with a uniformly spaced series of radially extending trunco-conical pockets in which the several rollers fit loosely. The thickness of the retainer-plate is slightly less than the diameter of the small inner ends of the rollers, so that parts of the rollers extend beyond each side of the plate, and the large or outer ends of the rollers are convex and extend slightly beyond the periphery of the retainer-plate. The rollers and retainer-plate are partially inclosed by a cup-shaped body comprising an annular plate 22 having an integral cylindrical peripheral flange 23 extending over the rollers so as to be engaged by the convex outer ends thereof, while the face of the plate 22 is formed to provide a race or bearing-surface for one side of the rollers 20. The cup-plate rests against the end of the head 12, and a flange 24 on said head extends through the central opening of the plate to center the same with the pin 8. In the end of the head 12 there are one or more dowel-pins 25 adapted to extend into openings 26 in the plate 22 to retain the same in fixed relation to the head. As shown in Fig. 3, said pins 25 and openings 26 are spaced uniformly about the axial center of the bearing, so that the cup-plate may be adjusted about said center to as many different positions as the number of the holes 26. For each position of the cup-plate one of several openings 27 therein will be in coincidence or register with a passage 28 through the head 12, communicating with the passage 18 before mentioned. By means of said passage 28 and openings 27 lubricant is supplied to the roller bearing surfaces.

It should be noted that when the plow is in use there is a very heavy lateral pressure exerted upon the disk 5, said pressure being greatest on the lower part of the disk and therefore tending to wear the corresponding portion of the cup-plate more rapidly than the remaining portions thereof. By shifting the cup-plate, as above described, to different positions upon the relatively fixed head 12, the wear of the cup-plate may be equalized for the different parts thereof. Wear of the rotating roller-race formed by the rear side of the backing-plate 6 is, of course, uniform. The entire assemblage of the bearing parts is held together by the nut 9, and when said nut is removed from the threaded portion of the pin 8 the latter may be withdrawn from the head, together with the plow-disk and backing-plate, leaving the bearing-rollers 20 and retainer-plate 21 resting within the cup-plate. Without removing the rollers and retainer-plate therefrom, the cup-plate may then be pulled out from the head far enough to disengage it from the pins 25, then turned to the desired position and replaced upon the head. The flange 23 of the cup-plate retains the rollers in position radially of the retainer-plate, and receives the end-thrust of said rollers caused by the lateral pressure thereon when the plow is in use. Said flange 23, in connection with the flange 19 of the backing-plate, also serves to exclude dirt and the like from the bearing. Similarly the flange 15 of the castle-nut 9, in connection with the end-flange 14 of the sleeve 13, serves to exclude dirt from the bearing of the pin 8 in said sleeve. A considerable amount of wear of the bearing may be taken up by adjusting the position of the nut 9 on the pin 8, and practical tests of the bearing under service conditions have shown the same to be extremely durable and reliable.

Now, having described my invention, what I claim and desire to secure by Letters Patent is:

In a disk-plow bearing, in combination, a relatively fixed supporting head, a backing-plate for the plow-disk, a center-pin fixedly secured to the backing-plate and fitting revolubly in said head, a nut screwed on the rear end of said center-pin for drawing the same and the backing-plate toward the head, an annular flange on the backing-plate fitting revolubly about the end of the head, a cup-plate disposed on the end of the head within said flange and facing oppositely thereto, a retainer-plate and a series of trunco-conical rollers disposed within the flange of the cup-plate, said rollers extending radially of the center-pin, and the adjacent sides of the backing-plate and cup-plate forming races for said rollers, and means for retaining the cup-plate in variously rotated positions relatively to the head, the supporting head being provided with lubricant passages communicating with the center-pin bearing and extending to the end of the head adjoining the cup-plate, and the cup-plate having a series of openings adapted to register with said lubricant passage at the several rotated positions of said cup-plate.

ALBERT JENSEN.